(12) United States Patent
Wheeler et al.

(10) Patent No.: US 11,117,751 B2
(45) Date of Patent: Sep. 14, 2021

(54) ENCLOSED BELT RAIL CONVEYOR SYSTEM

(71) Applicant: The University of Newcastle, Callaghan (AU)

(72) Inventors: Craig Anthony Wheeler, Callaghan (AU); Michael Carr, Callaghan (AU); Bin Chen, Callaghan (AU)

(73) Assignee: The University of Newcastle

( * ) Notice: Subject to any disclaimer, the term of this patent is extended or adjusted under 35 U.S.C. 154(b) by 0 days.

(21) Appl. No.: 16/754,078

(22) PCT Filed: Oct. 26, 2018

(86) PCT No.: PCT/AU2018/051156
§ 371 (c)(1),
(2) Date: Apr. 6, 2020

(87) PCT Pub. No.: WO2019/079859
PCT Pub. Date: May 2, 2019

(65) Prior Publication Data
US 2020/0290812 A1    Sep. 17, 2020

(30) Foreign Application Priority Data

Oct. 26, 2017 (AU) ................................ 2017904341

(51) Int. Cl.
*B65G 21/22* (2006.01)
*B65G 15/08* (2006.01)
(Continued)

(52) U.S. Cl.
CPC ............. *B65G 21/22* (2013.01); *B65G 15/08* (2013.01); *B65G 15/60* (2013.01); *B65G 39/16* (2013.01);
(Continued)

(58) Field of Classification Search
CPC ........ B65G 21/22; B65G 39/16; B65G 15/08; B65G 15/60; B65G 15/40; B65G 2201/04; B65G 21/2045; B65G 15/16
(Continued)

(56) References Cited

U.S. PATENT DOCUMENTS

| 2,928,525 A | * | 3/1960 | Schaeffer | ............... B65G 15/08 198/819 |
| 3,661,244 A | * | 5/1972 | Koyama | ............... B65G 15/40 198/819 |

(Continued)

FOREIGN PATENT DOCUMENTS

| CN | 88100575 A | 8/1988 |
| CN | 2388163 Y | 7/2000 |

(Continued)

OTHER PUBLICATIONS

International Search Report for corresponding Application No. PCT/AU2018/051156 dated Jan. 25, 2019, pp. 1-7.
(Continued)

*Primary Examiner* — James R Bidwell
(74) *Attorney, Agent, or Firm* — The Belles Group, P.C.

(57) ABSTRACT

An enclosed belt conveyor system has a rail track (1) and spaced apart carriages (35) that run on wheels (40) supported by the trail track. A continuous carry belt (10) is supported by the carriages (35) and has an enclosed configuration where the carry belt (10) encloses a bulk material for transport by the system. One or more belt guides (45) are positioned along the rail track (1) and engage the continuous carry belt to maintain it in its enclosed configuration.

20 Claims, 7 Drawing Sheets

(51) Int. Cl.
*B65G 15/60* (2006.01)
*B65G 39/16* (2006.01)
*B65G 15/16* (2006.01)

(52) U.S. Cl.
CPC .......... *B65G 15/16* (2013.01); *B65G 2201/04* (2013.01); *B65G 2812/02069* (2013.01); *B65G 2812/02168* (2013.01)

(58) Field of Classification Search
USPC ................................ 198/823–830, 819, 820
See application file for complete search history.

(56) References Cited

U.S. PATENT DOCUMENTS

| | | | | |
|---|---|---|---|---|
| 4,382,502 | A | | 5/1983 | Beresinsky |
| 4,630,726 | A | | 12/1986 | Hashimoto |
| 4,747,344 | A | * | 5/1988 | Hashimoto ............ B65G 15/08 100/173 |
| 4,760,913 | A | | 8/1988 | Tschantz |
| 5,031,753 | A | | 7/1991 | Tschantz |
| 5,060,787 | A | * | 10/1991 | Tingskog ............... B65G 15/08 198/819 |
| 5,161,675 | A | | 11/1992 | Engst et al. |
| 5,682,974 | A | * | 11/1997 | Van Der Kooy ...... B65G 15/08 198/819 |
| 2009/0078542 | A1 | * | 3/2009 | Fuchs .................... B65G 15/08 198/810.04 |
| 2016/0332822 | A1 | | 11/2016 | Brewka et al. |
| 2018/0128104 | A1 | * | 5/2018 | Rieger .................. B65G 15/62 |

FOREIGN PATENT DOCUMENTS

| | | |
|---|---|---|
| CN | 201395392 Y | 2/2010 |
| CN | 105523337 B | 4/2016 |
| DE | 3738730 A1 | 6/1989 |
| EP | 0315820 A1 | 5/1989 |
| GB | 2242878 A | 10/1991 |
| JP | 2016-160101 A | 9/2016 |
| WO | WO1989/005765 A1 | 6/1989 |
| WO | WO2016065406 A1 | 5/2016 |

OTHER PUBLICATIONS

International Preliminary Report on Patentability for corresponding Application No. PCT/AU2018/051156 dated Dec. 11, 2019, pp. 1-35.

Supplementary European Search Report issued in EP18871156.8 dated Jul. 19, 2021, pp. 1-8.

* cited by examiner

ENCLOSED BELT RAIL CONVEYOR SYSTEM

CROSS-REFERENCE TO RELATED PATENT APPLICATIONS

The present application is a U.S. national stage application under 35 U.S.C. § 371 of PCT Application No. PCT/AU2018/051156, filed Oct. 26, 2018, which claims priority to Australian Patent Application No. 2017904341, filed Oct. 26, 2017. The disclosures of the aforementioned priority applications are incorporated herein by reference in their entireties.

FIELD OF THE INVENTION

The invention relates to an enclosed belt rail conveyor system and in a particular to an enclosed belt rail conveyor system for transporting bulk materials. The invention has been developed primarily for use as an enclosed belt rail conveyor system for transporting coal and mineral ore bulk material and will be described hereinafter by reference to this application. However, it will be appreciated that the invention is not limited to this application and may be used to transport other bulk material, like powdered materials such as pharmaceutical substances, cement and fertiliser, and granular materials such as wheat and grain.

BACKGROUND OF THE INVENTION

The following discussion of the prior art is intended to present the invention in an appropriate technical context and allow its advantages to be properly appreciated. Unless clearly indicated to the contrary, however, reference to any prior art in this specification should not be construed as an express or implied admission that such art is widely known or forms part of common general knowledge in the field.

Pipe conveyor belt (PCB) systems typically comprise a conveyor belt that is curled around itself to form a closed "pipe" and are used extensively throughout the world to conveyor bulk materials. PCB systems are ideally suited to transporting bulk materials in environmentally sensitive areas; handling bulk materials that cannot be contaminated (i.e. cement, fertiliser, etc); where the conveyor is required to negotiate small radius sharp horizontal curves; and/or convey up or down greater angles than is possible for trough type or "troughed" belt conveyor systems. PCB systems are generally popular due to their environmental and flexibility benefits over existing trough type belt conveyors.

While PCB systems have many benefits they also have several significant drawbacks. The major disadvantages of PCB systems compared to conventional troughed type belt conveyors are that they are more expensive to build and operate. The pipe conveyor belts exhibit greater motion resistances due to the additional components required to form and maintain the belt in its pipe shape. There additional components typically comprise providing supporting frames having multiple idler rollers that surround the belt like a collar to form and maintain the pipe shape. Consequently, these greater motion resistances lead to an increased belt tension that requires larger pulleys, drives, take-ups and increased structural requirements in the PCB system. Hence, there are greater CAPEX and OPEX costs associated with PCB systems.

It is an object of the present invention to overcome or substantially ameliorate one or more of the disadvantages of prior art, or at least to provide a useful alternative. It is an object of the invention in at least one preferred form to provide a PCB system that possesses the advantages of existing PCB system technology at reduced CAPEX and OPEX costs.

SUMMARY OF THE INVENTION

A first aspect of the invention provides an enclosed conveyor belt system for transporting bulk material, comprising:
 a rail track;
 a plurality of carriages spaced apart from one another and arranged to run on wheels supported by the rail track;
 a continuous carry belt supported by the carriages, the continuous carry belt having an enclosed configuration where the continuous carry belt encloses the bulk material; and
 at least one belt guide positioned along the rail track;
 wherein the at least one belt guide is engageable with the continuous carry belt to maintain the continuous carry belt in the enclosed configuration.

In some embodiments, the at least one belt guide comprises one or more guide elements engageable with the continuous carry belt.

In a further embodiment, the guide elements are connected in series. In another embodiment, the guide elements are connected in parallel.

In some embodiments, at least one guide element engages an overlapping portion of the continuous carry belt in the enclosed configuration.

In some embodiments, the at least one belt guide comprises one or more rollers. The rollers may be cylindrical in shape. In other embodiments, the at least one belt guide comprises one or more plates. In a further embodiment, the at least one belt guide comprises one or more balls. The balls may be spherical, ovoid or oblong in shape. In yet another embodiment, at least one belt guide comprises a plurality of rolling elements. The rolling elements may be mounted on an axle. The rolling elements may be beads or balls.

In some embodiments, the at least one belt guide is positioned on a delivery run of the rail track extending between a loading end and a discharge end. In another embodiment, another at least one belt guide is positioned on the return run of the rail track extending between the loading end and the discharge end.

In a further embodiment, the at least one belt guide is positioned on a return run of the rail track extending between a loading end and a discharge end.

In some embodiments, the at least one belt guide is mounted to frame adjacent the rail track so that the at least one belt guide is positioned over the continuous carry belt in the enclosed configuration.

In some embodiments, there is a plurality of the at least one belt guides located at regular intervals along the track.

In some embodiments, the rail track comprises a loading end, a discharge end and one or more belt forming stations located at the loading end and/or the discharge end to manipulate the continuous carry belt into the enclosed configuration. In further embodiments, the belt forming stations each comprises one or more belt forming guides to curl the continuous carry belt so that it overlaps in the enclosed configuration.

In some embodiments, the continuous carry belt comprises an assembly of a supporting belt for receiving the bulk material and a cover belt for covering the bulk material in the enclosed configuration. In further embodiments, the at least one belt guide engages the cover belt to maintain the continuous carry belt in the enclosed configuration.

In other embodiments, the rail track comprises a belt forming station located at the loading end to removably connect the cover belt to the supporting belt to form the continuous carry belt into the enclosed configuration. In another embodiment, the rail track comprises a belt unwinding station located at the discharge end to disconnect the cover belt from the supporting belt to change the continuous carry belt from the enclosed configuration to an open configuration.

A second aspect of the present invention provides a method for transporting bulk material, comprising:

depositing the bulk material on a continuous carry belt supported by a plurality of carriages spaced apart from one another and arranged to run on wheels supported by a rail track;

placing the continuous carry belt into an enclosed configuration where the continuous carry belt encloses the bulk material; and maintaining the continuous carry belt in the enclosed configuration as it travels along the rail track with at least one belt guide positioned along the rail track to engage the continuous carry belt.

Preferably, the method has the preferred features of the first aspect of the invention stated above, where applicable.

In some embodiments, the method comprises arranging the guide elements in series. In other embodiments, the method comprises arranging the guide elements in parallel.

In some embodiments, the method comprises engaging an overlapping portion of the continuous carry belt with the at least one guide element in the enclosed configuration.

In some embodiments, the at least one belt guide comprises a biasing member for biasing the guide elements into engagement with the continuous carry belt. In one embodiment, the biasing member comprises a compressible spring member.

In some embodiments, the method comprises positioning the at least one belt guide on a delivery run of the rail track extending between a loading end and a discharge end. In further embodiments, the method comprises positioning another at least one belt guide on a return run of the rail track extending between a loading end and a discharge end.

In some embodiments, the method comprises positioning the at least one belt guide on a return run of the rail track extending between a loading end and a discharge end.

In some embodiments, the method comprises locating a plurality of the at least one belt guides at regular intervals along the track.

In some embodiments, the method comprises mounting the at least one belt guide over the continuous carry belt in the enclosed configuration.

In some embodiments, the method comprises manipulating the continuous carry belt into the enclosed configuration at a loading end and/or a discharge end of the rail track. In some embodiments, the method comprises the manipulating step comprises curling the continuous carry belt so that it overlaps in the enclosed configuration.

In some embodiments, the method comprises assembling the continuous carry belt in the enclosed configuration from a supporting belt for receiving the bulk material and a cover belt for covering the bulk material in the enclosed configuration, wherein the at least one belt guide engages the cover belt to maintain the continuous carry belt in the enclosed configuration. In some embodiments, the method comprises removably connecting the cover belt to the supporting belt at a loading end of the rail track to form the continuous carry belt into the enclosed configuration. In another embodiment, the method comprises removing the cover belt from the supporting belt at a discharge end of the rail track to change the continuous carry belt from the enclosed configuration to an open configuration.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
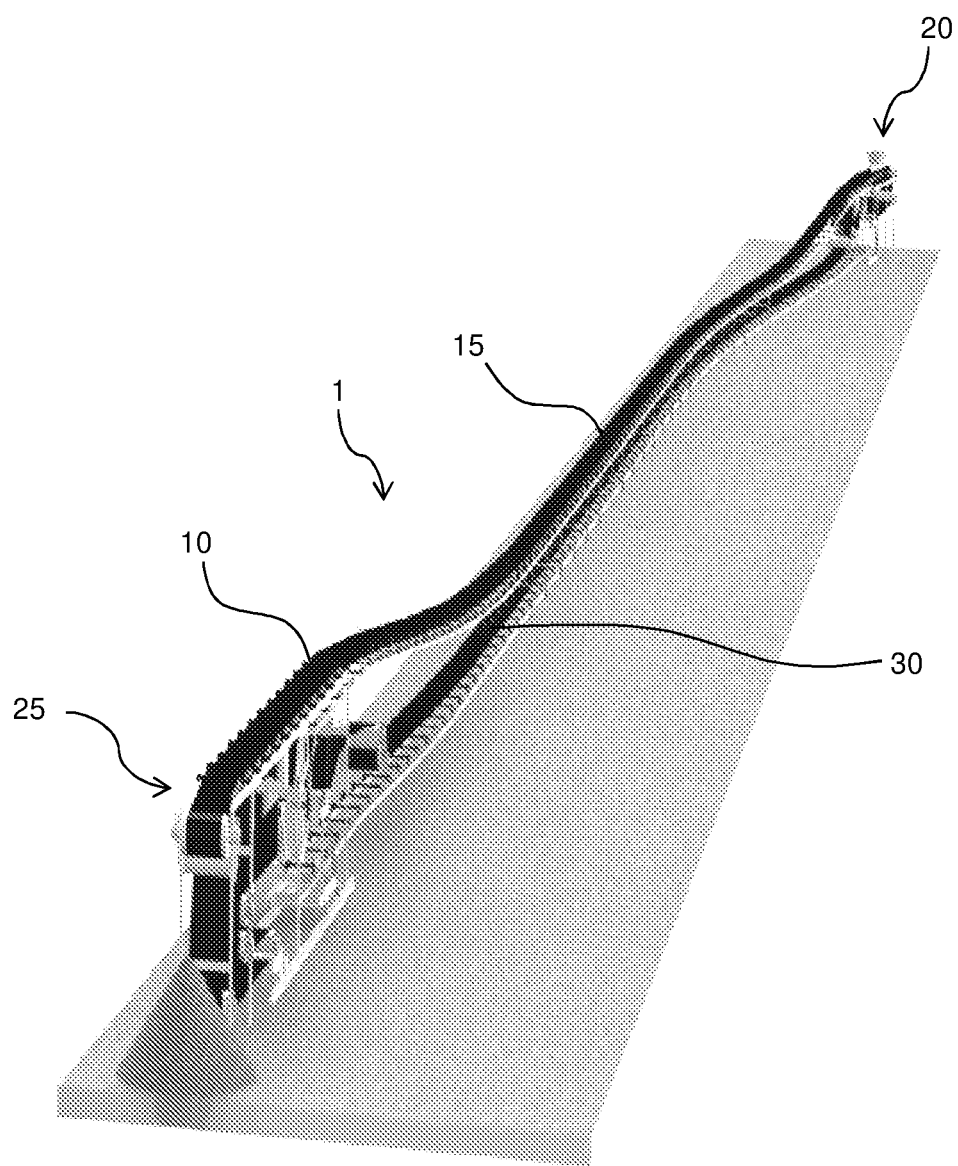
FIG. 1 is a perspective view of a rail track for use with an embodiment of the invention.
Figure 2:
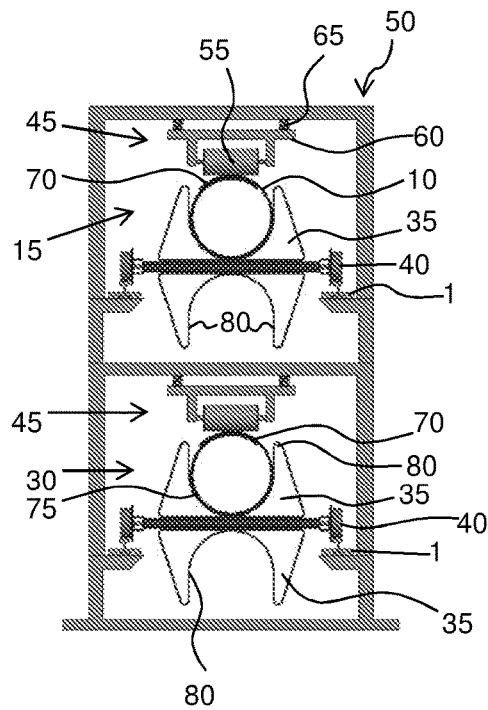
FIG. 2 is a cross-sectional view of one embodiment of the invention.
Figure 3:
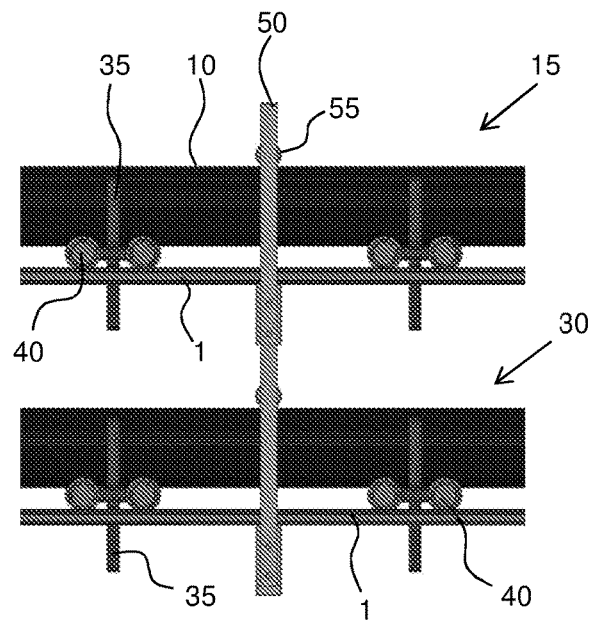
FIG. 3 is a side view of the embodiment of FIG. 2.
Figure 4:
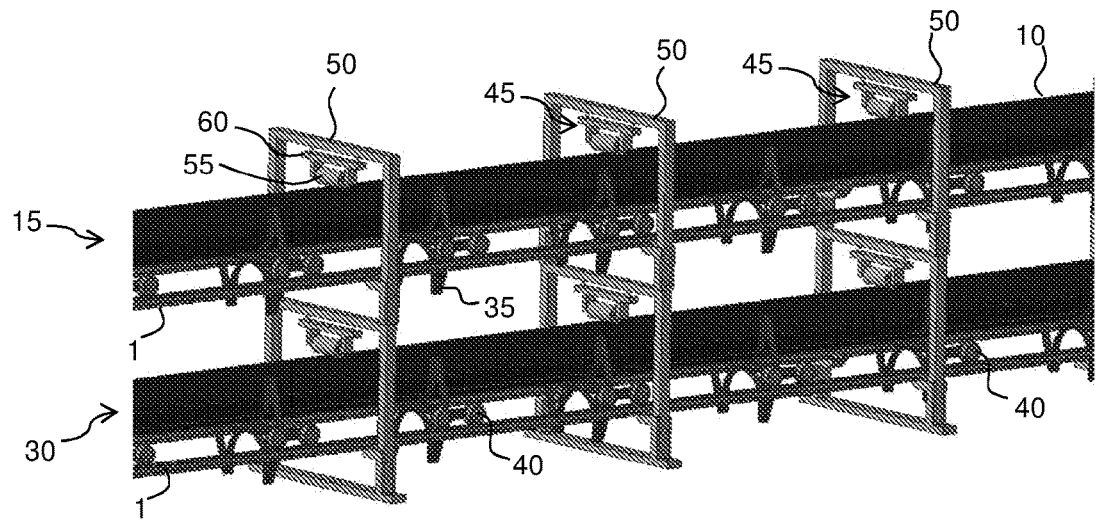
FIG. 4 is a perspective view of the embodiment of FIG. 2.
Figure 5:
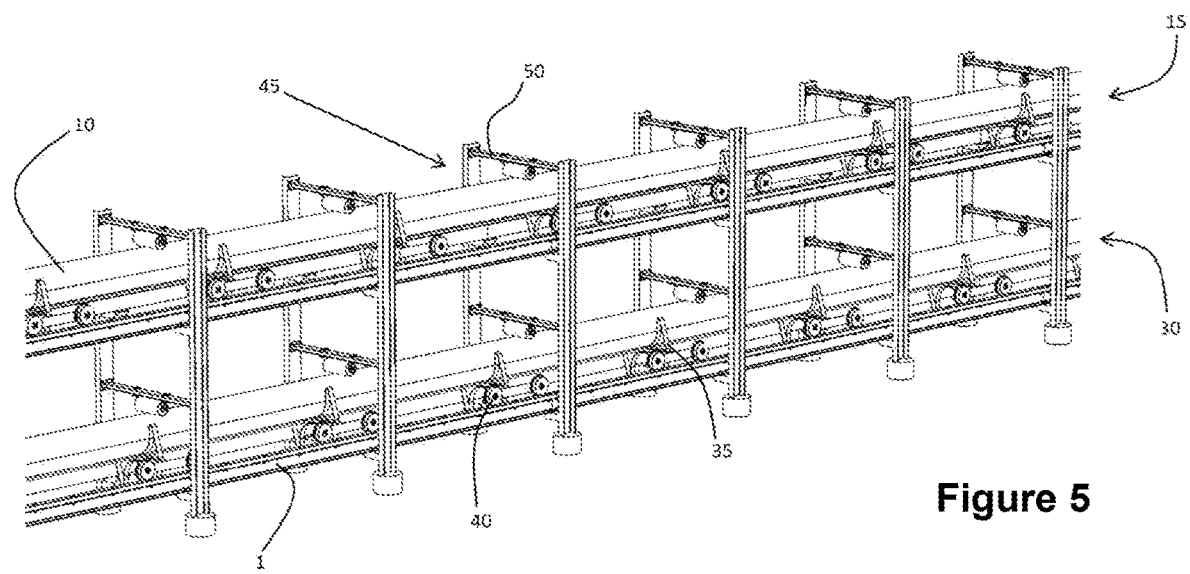
FIG. 5 is another perspective view of the embodiment of FIG. 2.

The present invention will now be described with reference to the following examples which should be considered in all respects as illustrative and non-restrictive. In the Figures, corresponding features within the same embodiment or common to different embodiments have been given the same reference numerals.

Referring to FIG. 1, a rail track 1 for use with preferred embodiments of the invention is illustrated. A continuous carry belt 10 on the rail track 1 transports bulk material, such as coal or mineral ore along a delivery run 15 between a loading end 20 and a discharge end 25. The coal or mineral ore is loaded onto the belt 10 at the loading end 20 and carried by the delivery run 15 towards the discharge end 25, where the bulk material is unloaded. The empty belt 10 is supported by the carriage 35 along to a return run 30 underneath the delivery run 15 between the loading end 20 and the discharge end 25.

As best shown in FIGS. 2 to 5, the continuous carry belt 10 is supported by a plurality of carriages 35 spaced apart from one another and arranged to run on wheels 40 supported by the rail track 1. The carry belt 10 is in an enclosed configuration where the belt 10 encloses the bulk material and essentially has a pipe-like shape. In addition, the delivery run 15 is shown above the return run 30.

Belt guides 45 are provided at regular intervals along the rail track 1 and mounted to a frame 50. In other embodiments, the belt guides may be provided where desired, and need not be placed at regular intervals along the track 1. The belt guides 45 each comprise a guide element in the form of a roller 55, preferably of cylindrical shape, and a mounting member 60 for mounting the belt guide 45 to the frame via a biasing member in the form of a compressible spring 65. The spring 65 applies a biasing force to the roller 55 via the frame 60 to ensure that the roller 55 maintains contact with the carry belt 10, preferably at its overlapping portion 70, and thus retain the carry belt in its enclosed configuration. Also, the carriages 35 assist in keeping the carry belt 10 in the enclosed configuration due to their support of the carry belt 10 around a substantial part of the non-overlapping portion 75 of the carry belt 10. In other words, the carriages 35 have sidewalls 80 that engage the non-overlapping portion 75 to retain the pipe-like shape of the carry belt 10 in the enclosed configuration.

In addition, the spring 65 provides some resilience to the mounting of the belt guides 45 to account for any deviations in the width of the carry belt 10 due to manufacturing variances in the thickness of the belt and/or variations in the volume of the bulk material held within the carry belt. Thus, the rollers 55 may move up or down as they engage the carry belt 10 as it transports the bulk material along the rail track 1.

Figure 6:
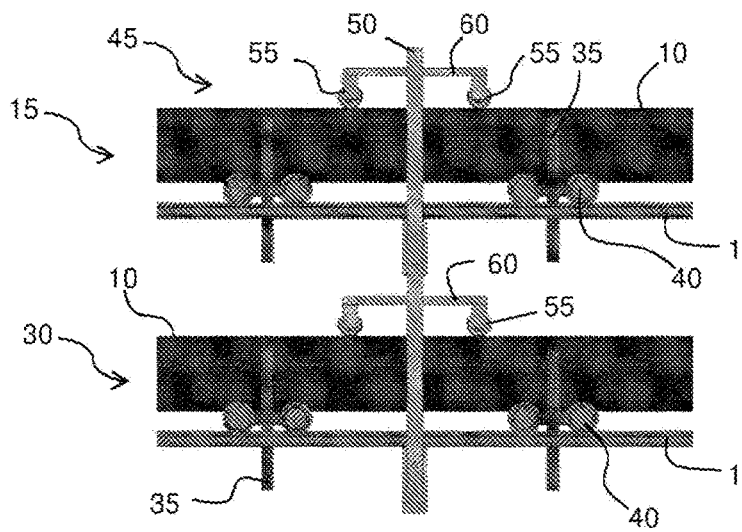
FIG. 6 is a side view of another embodiment of the invention.
Figure 7:
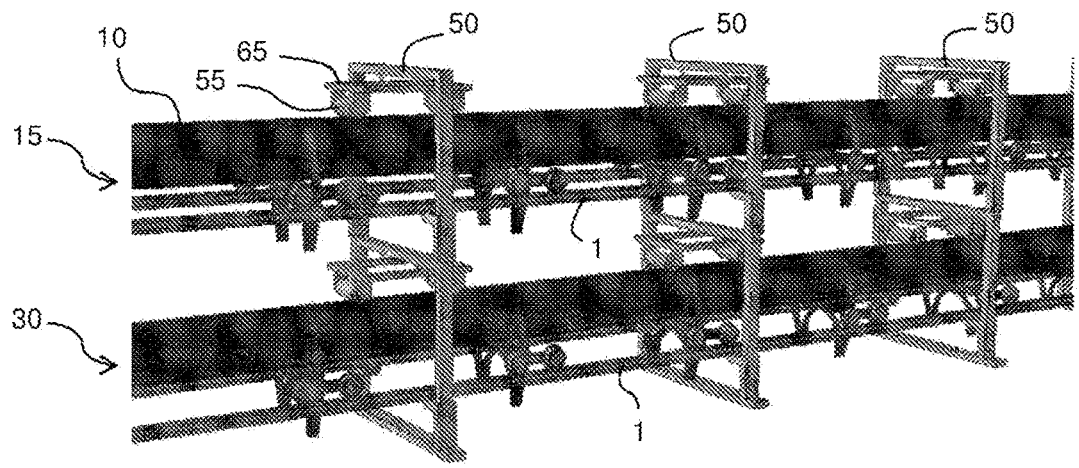
FIG. 7 is perspective view of the embodiment of FIG. 6.

Referring to FIGS. 6 and 7, another embodiment of the invention is illustrated where each belt guide 45 comprises two rollers 55 connected in series by a modified frame 60. In this embodiment, the additional roller 55 further assists the belt guide 45 in retaining the carry belt 10 in the enclosed configuration in combination with the sidewalls 80 of the carriages 35.

Figure 8:
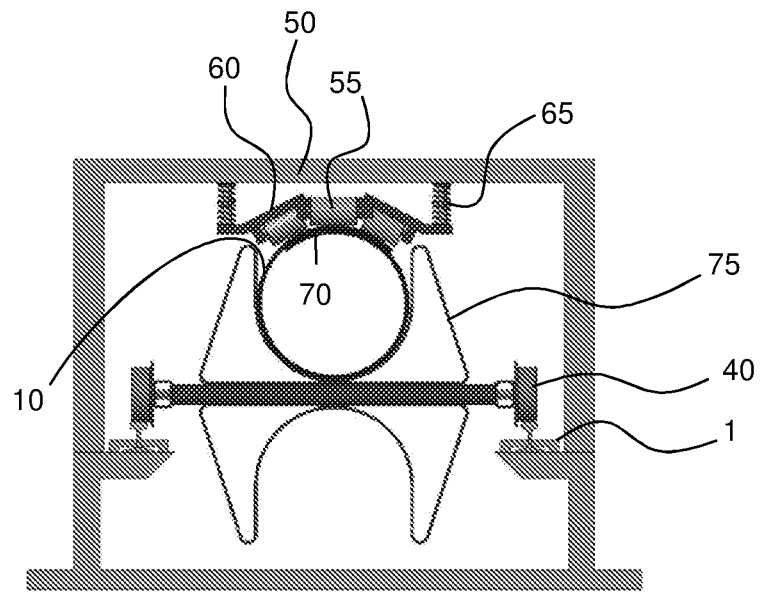
FIG. 8 is a cross-sectional view of a further embodiment of the invention.
Figure 9:
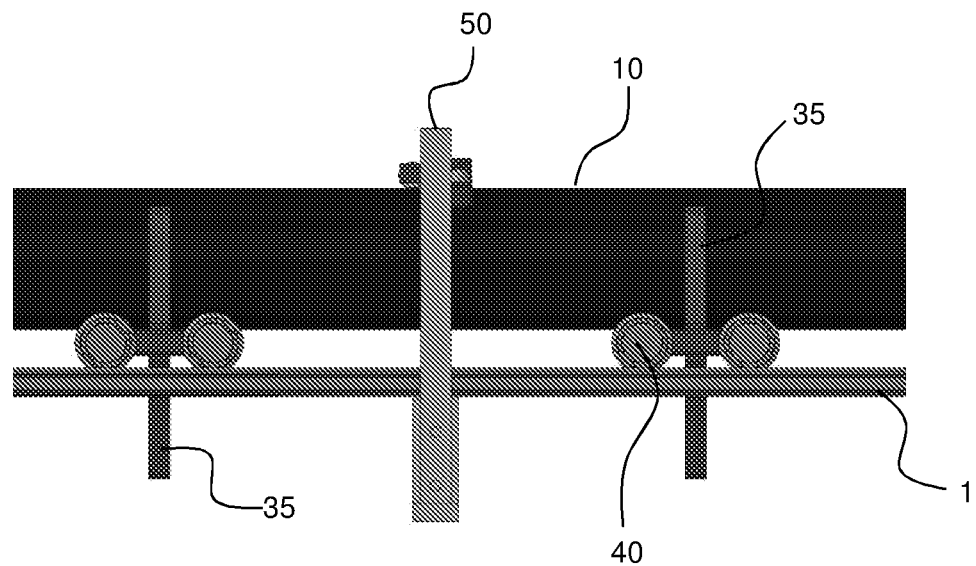
FIG. 9 is a side view of the embodiment of FIG. 8.

In FIGS. 8 and 9, a further embodiment of the invention is illustrated where each belt guide 45 comprises three rollers 55 connected in parallel by a modified frame 60. As with the embodiment of FIGS. 6 and 7, the additional rollers 55 further assist the belt guide 45 in retaining the carry belt 10 in the enclosed configuration in combination with the sidewalls 80 of the carriages 35.

It will be appreciated that in the embodiments of FIGS. 6 to 9, multiple rollers 55 may be connected in series or parallel for each belt guide 45 and is not limited to the illustrated number of rollers. Moreover, a combination of rollers connected in series and parallel can be provided for each belt guide 45. For example, there may be a first set of rollers 55 may be connected in parallel as shown in FIGS. 8 and 9 and a second set of rollers 55 also connected in parallel. Both sets of rollers 55 are then connected to the frame 60 in series on the same belt guide 45.

Figure 10:
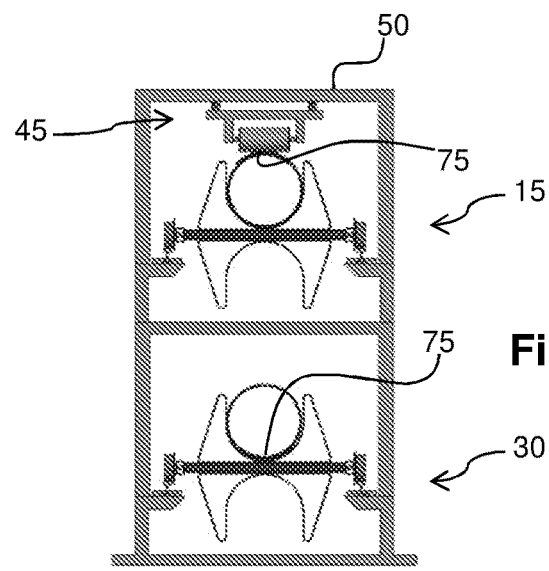
FIG. 10 is a cross-sectional view of yet another embodiment of the invention.
Figure 11:
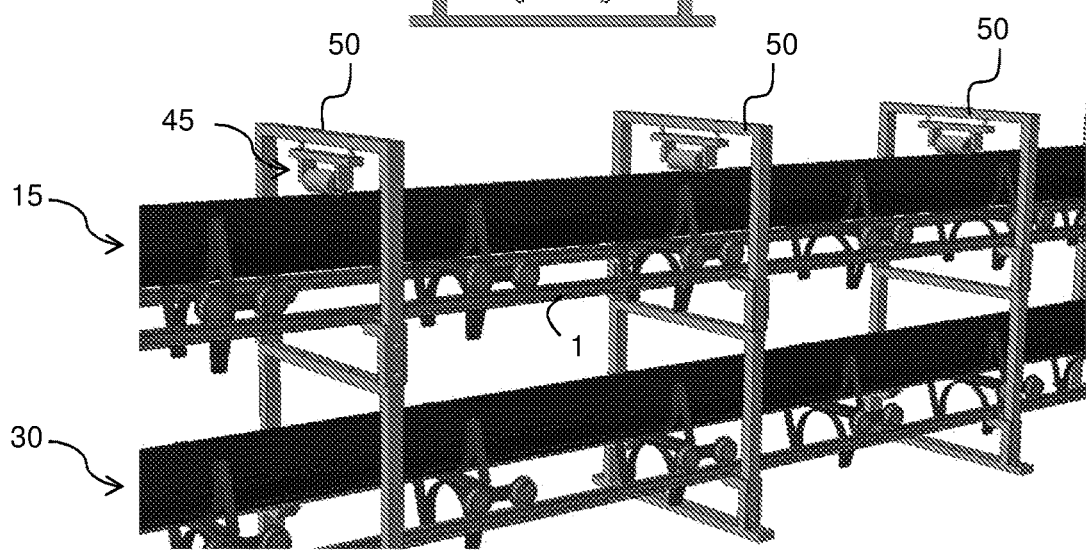
FIG. 11 is a perspective view of the embodiment of FIG. 10.
Figure 12:
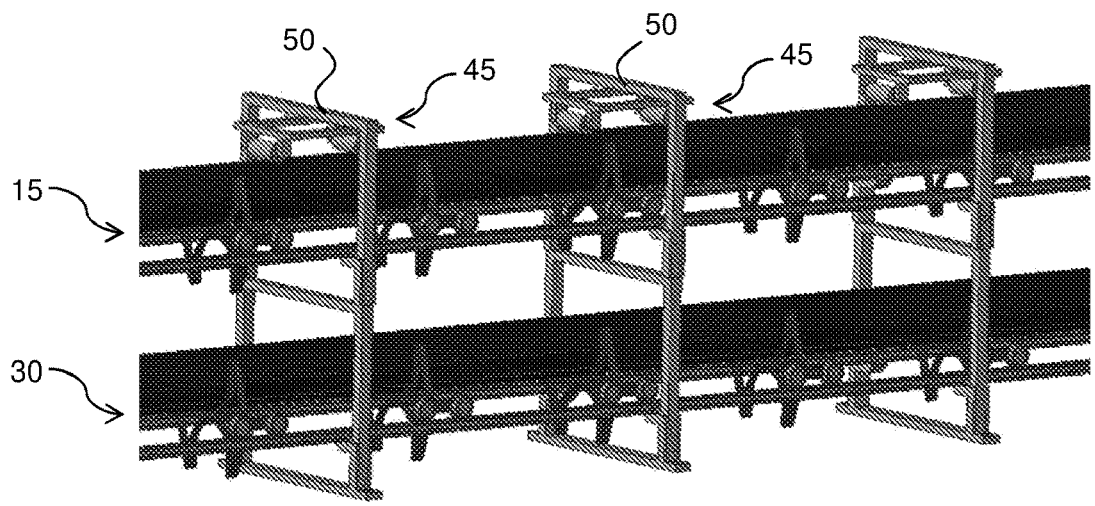
FIG. 12 is a perspective view of a variation of the embodiment of FIG. 10.

FIGS. 10 to 12 illustrate yet another embodiment of the invention, where the belt guides 45 are only provided for the delivery run 15 of the rail track 1 and not the return run 30. In this case, the carry belt 10 is inverted on the return run 30 so that its overlapping portion 70 lies at the bottom of the carriages 35, as best shown in FIG. 10. Hence, the carry belt 10 is held in the enclosed configuration by its own weight upon the overlapping portion 70 and so no belt guides 45 are required for the return run 30 (although it may be preferred for safety and/or design purposes). FIG. 11 shows a single roller 55 for the belt guide 45 while FIG. 12 shows two rollers 55 connected in series for the belt guide 45.

Figure 13:
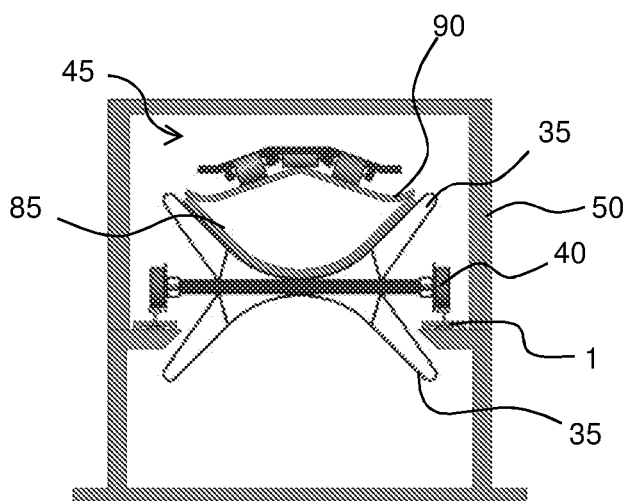
FIG. 13 is a cross-sectional view of a further embodiment of the invention.
Figure 14:
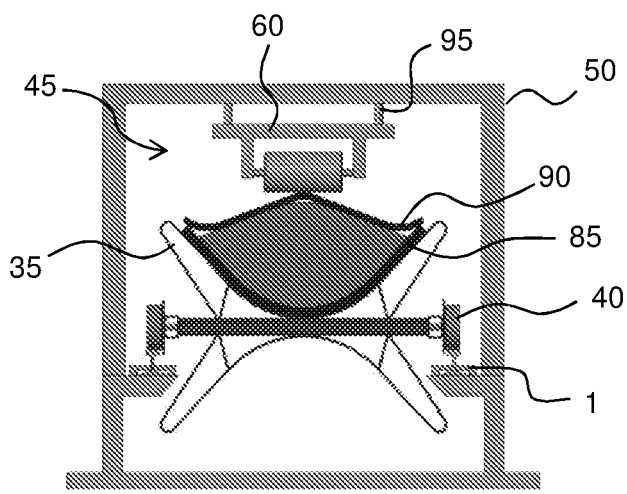
FIG. 14 is a cross-sectional view of a still further embodiment of the invention.
Figure 15:
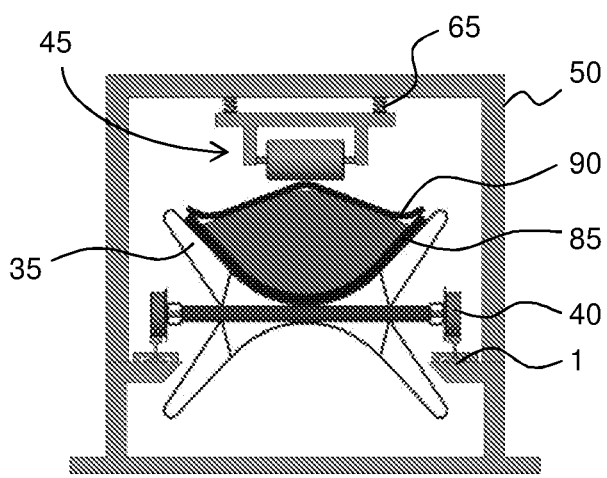
FIG. 15 is a cross-sectional view of yet another embodiment of the invention.

Another embodiment of the invention is illustrated in FIGS. 13 to 15, where the continuous carry belt takes the form of an assembly of a supporting or base belt 85 for receiving the bulk material and a cover belt 90 for covering the bulk material in the enclosed configuration. In this instance, the belt guides 45 (either having multiple rollers 55 as in FIG. 13 or a single roller 55 as in FIGS. 14 and 15) engage the cover belt to maintain it in place and keep the carry belt assembly in the enclosed configuration. FIG. 14 also illustrates an alternative mounting for the belt guide 45, using static mounting arms 95 fixed to the frame 50 and mounting frame 60, instead of the moveable mounting by way of the compressible spring 65 as shown in FIG. 15. A static mounting for the belt guides 45 may be used where there is little variation in the volume of the bulk material held by the carry belt 10 or it is desired to have the carry belt at a predetermined width as it travels along the rail track 1. It should also be appreciated that this static type of mounting may also be applied to the belt guides 45 shown in the previous Figures.

Figure 16:
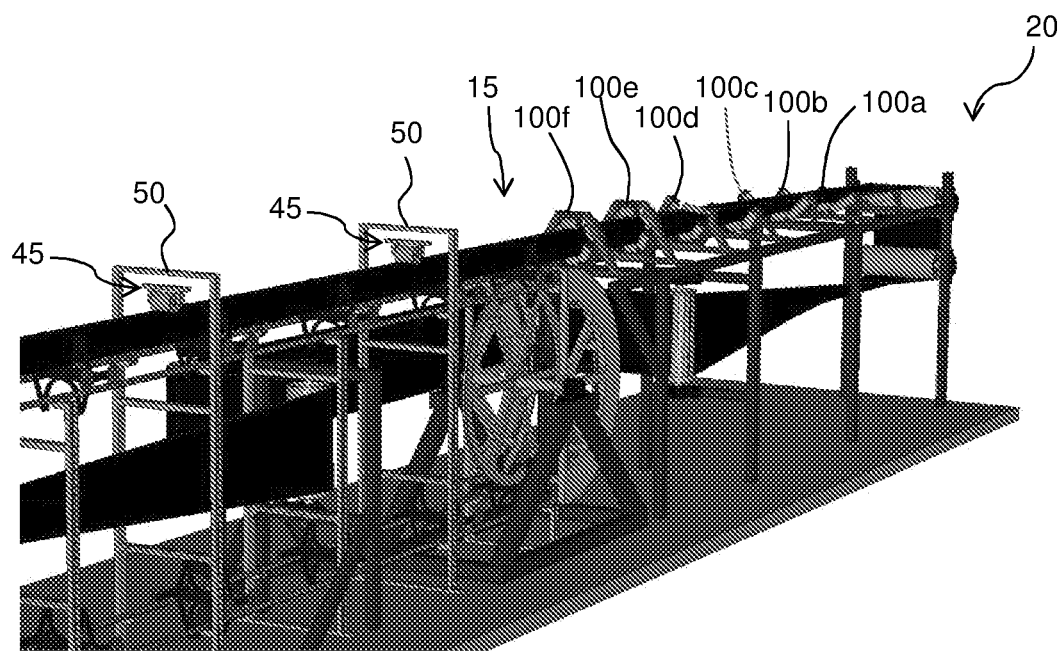
FIG. 16 is a perspective view of a loading end of an enclosed conveyor belt system according to a further embodiment of the invention.

FIG. 16 illustrates the loading end 20 of the system where a set of belt forming stations 100a to 100f progressively manipulate the continuous carry belt 10 so that it curl or overlap upon itself into the enclosed configuration. Initially, belt forming stations 100a to 100c comprise only three rollers that gradually curl the sides of the continuous carry belt 10, which at this stage has received the load of bulk material. The partly curled carry belt 10 then travels to the belt forming station 100d that has more rollers may increase the curvature of the belt 10. Finally, the belt forming stations 100e and 100f surround the belt 10 to curl it over to create an overlap and thus the enclosed configuration. In other embodiments, there may be a single belt forming station that curls the carry belt 10 into the enclosed configuration.

Figure 17:
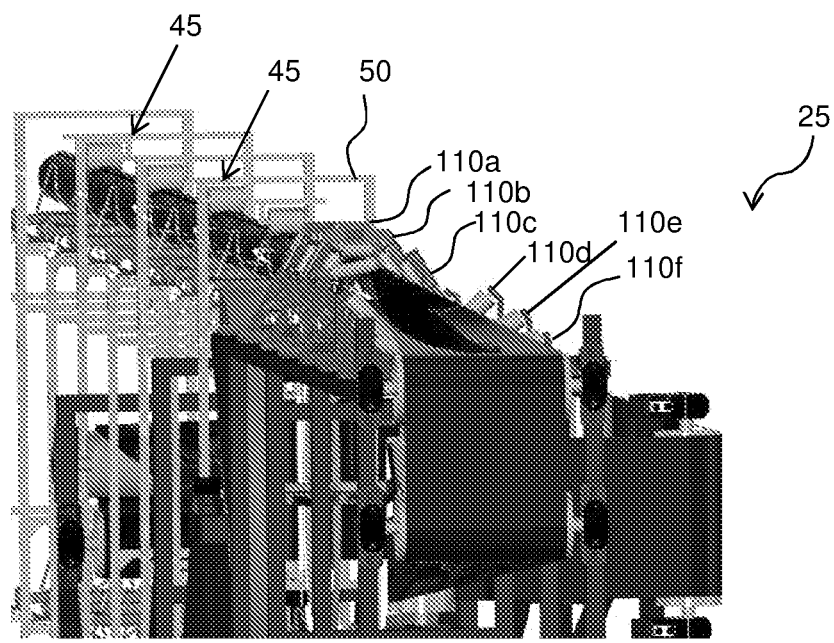
FIG. 17 is a perspective view of a discharge end of an enclosed conveyor belt system according to a further embodiment of the invention.

FIG. 17 illustrates the opposite discharge end 25 where a set of belt unwinding stations 110a to 110f are provided to progressively manipulate the continuous carry belt 10 so that that it uncurls itself from the enclosed configuration into an open configuration to discharge the load of bulk material. The belt unwinding stations 110a to 110f essentially mirror the belt forming stations 100a to 100f and reverse the curling process performed at the loading end 20. In other embodiments, there may be a single belt unwinding station that uncurls the carry belt 10 from the enclosed configuration into the open configuration.

While the preferred embodiments of the invention have been described as using belt guide elements in the form of the rollers 55, it will be appreciated by those skilled in the art that the guide elements of the belt guides 45 can take other forms. For example, instead of a cylindrical roller, the guide element may be a planar guide or plate; a ball; or a plurality of rolling elements (such as beads or small balls) mounted on an axle similar to beads mounted on a rod. In the case of a planar guide or plate, it may be mounted to an arm connected to the frame 60 or biasing member 65. Alternatively, the planar guide or plate may be mounted directly to the frame 60 or biasing member 65. In the case of a ball, it may be spherical, ovoid or oblong in shape.

It will further be appreciated that any of the features in the preferred embodiments of the invention can be combined together and are not necessarily applied in isolation from each other. For example, the different types of roller configurations illustrated in FIGS. 2 to 9 can be used in combination in the same conveyor belt system instead of separately. Similar combinations of two or more features from the above described embodiments or preferred forms of the invention can be readily made by one skilled in the art.

In each of the preferred embodiments of the invention, the use of rail-based carriages to support the majority of the carry belt in the enclosed configuration obviates the necessity to provide support frames having multiple idler rollers as in current PCB systems and instead a smaller number of belt guides may be used to retain the carry belt in its enclosed configuration. This reduction in the number of idler rollers significantly reduces the motion resistances in the carry belt 10 and hence reduces the required belt tension. This means that it is no longer necessary to provide larger pulleys, drives, take-ups and increased structural requirements that were necessary to provide an increased belt tension. Consequently, the CAPEX and OPEX costs are significantly reduced or eliminated, making the invention more cost-effective to implement and operate with significant energy savings over existing PCB systems whilst retaining the advantages of a PCB system: environmentally safer; protective bulk materials from contamination; the ability to negotiate small radius horizontal curves; and the ability to convey bulk material at steeper angles than is possible in troughed systems. In all these respects, the invention represents a practical and commercially significant improvement over the prior art.

Although the invention has been described with reference to specific examples, it will be appreciated by those skilled in the art that the invention may be embodied in many other forms.

The invention claimed is:

1. An enclosed conveyor belt system for transporting bulk material, comprising:
   a rail track;
   a plurality of carriages spaced apart from one another and arranged to run on wheels supported by the rail track;
   a continuous carry belt supported by the carriages, the continuous carry belt having an enclosed configuration where the continuous carry belt encloses the bulk material; and
   a plurality of belt guides fixed in position adjacent the rail track and spaced apart along the length of the rail track;
   wherein the plurality of belt guides are directly engageable with the continuous carry belt to maintain the continuous carry belt in the enclosed configuration as it travels along the rail track.

2. The enclosed conveyor belt system of claim 1, wherein the plurality of belt guides each comprises one or more guide elements engageable with the continuous carry belt.

3. The enclosed conveyor belt system of claim 2, wherein the guide elements are connected in series.

4. The enclosed conveyor belt system of claim 2, wherein the guide elements are connected in parallel.

5. The enclosed conveyor belt system of claim 1, wherein the plurality of belt guides each comprise one or more rollers.

6. The enclosed conveyor belt system of claim 1, wherein the plurality of belt guides each comprise one or more plates.

7. The enclosed conveyor belt system of claim 2, wherein the plurality of belt guides each comprise a biasing member for biasing the guide elements into engagement with the continuous carry belt.

8. The enclosed conveyor belt system of claim 1, wherein the plurality of belt guides are each mounted to a frame fixed adjacent the rail track so that the plurality of belt guides are positioned over the continuous carry belt in the enclosed configuration.

9. The enclosed conveyor belt system of claim 1, wherein the plurality of belt guides are located at regular intervals along the track.

10. The enclosed conveyor belt system of claim 1, wherein the rail track comprises a loading end, a discharge end and one or more belt forming stations located at the loading end and/or the discharge end to manipulate the continuous carry belt into the enclosed configuration.

11. The enclosed conveyor belt system of claim 10, wherein the belt forming stations each comprises one or more belt forming guides to curl the continuous carry belt so that it overlaps in the enclosed configuration.

12. The enclosed conveyor belt system of claim 1, wherein the continuous carry belt comprises an assembly of a supporting belt for receiving the bulk material and a cover belt for covering the bulk material in the enclosed configuration, wherein the plurality of belt guides engage the cover belt to maintain the continuous carry belt in the enclosed configuration.

13. The enclosed conveyor belt system of claim 12, wherein the rail track comprises a belt unwinding station located at the discharge end to disconnect the cover belt from the supporting belt to change the continuous carry belt from the enclosed configuration to an open configuration; and
   a belt forming station located at the loading end to removably connect the cover belt to the supporting belt to form the continuous carry belt into the enclosed configuration.

14. The enclosed conveyor belt system of claim 2, wherein at least one guide element engages an overlapping portion of the continuous carry belt in the enclosed configuration.

15. A method for transporting bulk material, comprising:
   depositing the bulk material on a continuous carry belt supported by a plurality of carriages spaced apart from one another and arranged to run on wheels supported by a rail track;
   placing the continuous carry belt into an enclosed configuration where the continuous carry belt encloses the bulk material;
   placing a plurality of belt guides in fixed positions adjacent the rail track and spaced apart along a length of the rail track; and
   maintaining the continuous carry belt in the enclosed configuration as it travels along the rail track with the plurality of belt guides directly engaging the continuous carry belt as it travels along the rail track.

16. The method of claim 15, further comprising locating the plurality of belt guides at regular intervals along the track.

17. The method of claim 15, wherein the plurality of belt guides each comprise one or more guide elements engageable with the continuous carry belt, the method further comprising biasing the guide elements into engagement with the continuous carry belt.

18. The method of claim 15, comprising curling the continuous carry belt so that it overlaps in the enclosed configuration and engaging an overlapping portion of the continuous carry belt with the at least one guide element in the enclosed configuration.

19. The method of claim 15, comprising assembling the continuous carry belt in the enclosed configuration from a supporting belt for receiving the bulk material and a cover belt for covering the bulk material in the enclosed configuration, wherein the plurality of belt guides engage the cover belt to maintain the continuous carry belt in the enclosed configuration.

20. The method of claim 19, comprising removably connecting the cover belt to the supporting belt at a loading end of the rail track to form the continuous carry belt into the enclosed configuration and removing the cover belt from the supporting belt at a discharge end of the rail track to change the continuous carry belt from the enclosed configuration to an open configuration.

* * * * *